(12) United States Patent
Sandler

(10) Patent No.: US 11,855,443 B2
(45) Date of Patent: Dec. 26, 2023

(54) CONTROL SYSTEM AND METHOD FOR DOUBLE CHECK

(71) Applicant: Buyers Products Company, Mentor, OH (US)

(72) Inventor: Philip Sandler, Mayfield Village, OH (US)

(73) Assignee: Buyers Products Company, Mentor, OH (US)

( * ) Notice: Subject to any disclaimer, the term of this patent is extended or adjusted under 35 U.S.C. 154(b) by 0 days.

(21) Appl. No.: 17/736,355

(22) Filed: May 4, 2022

(65) Prior Publication Data

US 2023/0361554 A1 Nov. 9, 2023

(51) Int. Cl.
*H02H 7/08* (2006.01)
*H02H 1/00* (2006.01)

(52) U.S. Cl.
CPC ............ *H02H 7/08* (2013.01); *H02H 1/0007* (2013.01)

(58) Field of Classification Search
CPC ............................. H02H 7/08; H02H 1/0007
See application file for complete search history.

(56) References Cited

U.S. PATENT DOCUMENTS 6,532,140 B1 3/2003 McMahon et al.
8,286,300 B2 10/2012 Norell et al.
9,634,478 B2 4/2017 Chen et al.
9,689,925 B2 6/2017 Berland et al.
2010/0320946 A1 12/2010 Ueda
2013/0082602 A1* 4/2013 Bradford ................ H05B 45/58
315/122
2014/0078629 A1* 3/2014 Cortigiani .............. H03K 17/24
361/79
2015/0340187 A1* 11/2015 Holzmann ............. G11C 17/16
361/104
2021/0288494 A1* 9/2021 Veluru ..................... H02B 1/26

\* cited by examiner

*Primary Examiner* — Scott Bauer
(74) *Attorney, Agent, or Firm* — Emerson, Thomson & Bennett, LLC; Roger D. Emerson; Matt J. Wilson

(57) ABSTRACT

Provided in this disclosure is a control system and method that monitors current in a spreader motor to accurately detect a mechanical overload condition. The invention distinguishes between a short duration high current transient spike caused by sparking of brushes in the DC motor, and a long duration continuous high current caused by a mechanical overload condition in the DC motor. The control system momentarily deactivates and reactivates the motor. If high current is no longer detected, the control system construes this as a transient spike and no fault condition is indicated. If high current persists, the control system construes this as an actual overload condition, and a fault condition is indicated to the operator. In this manner, a selected default current level can be established in the control system which can be selectively reestablished if conditions within the device change over time.

16 Claims, 1 Drawing Sheet

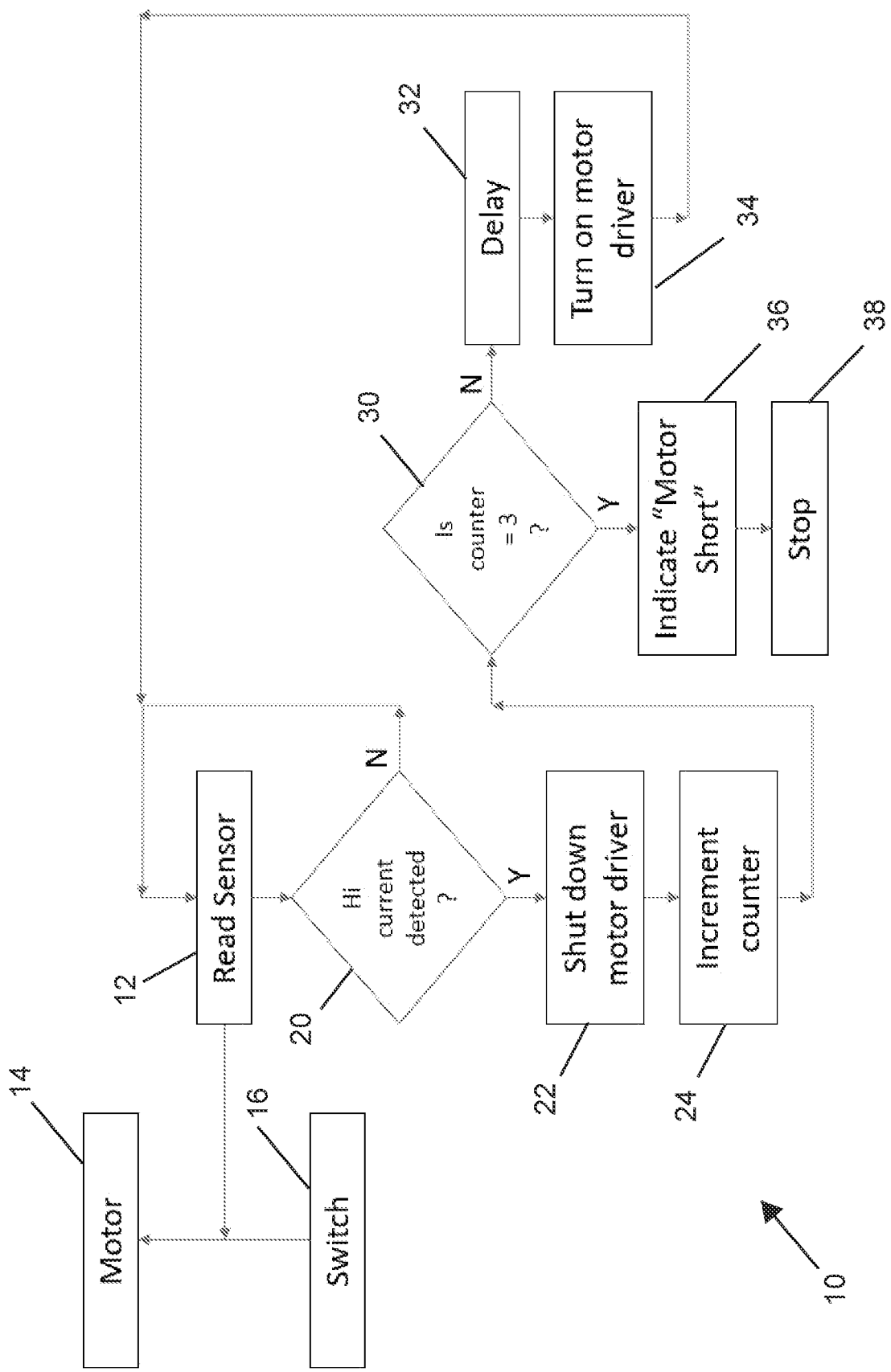

CONTROL SYSTEM AND METHOD FOR DOUBLE CHECK

I. BACKGROUND

A. Technical Field

This invention generally pertains to the field of mechanical overload detection, specifically the field of detecting an electrical overcurrent condition produced within a motor indicative of a mechanical overload condition, and methods and systems for distinguishing between actual overloads and false indications.

B. Description of Related Art

Spreader systems are used for distributing a material onto a surface, such as spreading salt or sand spread onto a roadway to melt snow and ice in the winter. A spreader includes a hopper for retaining a quantity of material, and also includes a conveyor such as a screw or a pintle chain for conveying the material from the hopper to a spinner disc, where it is centrifugally distributed onto the roadway.

Like many mechanical systems, spreader systems are powered by electrical motors, in order to drive the conveyor and the spinner disc. In certain circumstances, a spreader motor can encounter significant resistance and can become overloaded, such as when there is too large a load of material, or when the spreader is operated too fast, or when the mechanical components encounter a rock or other hard object that jams the mechanical components. In such instances, the jamming of the mechanical components causes the electrical motor to work harder to overcome the resistance, resulting in an overcurrent condition in the electrical motor that drives the mechanical components which can result in burnout in the electrical motor.

In order to prevent motor burnout, it is known to provide a control system that monitors current of a spreader motor. The control system can include a fuse or switch that detects current spikes and deactivates the electrical motor. However, a problem can arise with false overload indications. Spreader systems use a brushed DC motor. Occasionally, the brushes can produce a transient spark within the motor, which creates electrical noise in the system. The control system can falsely construe such transient sparks as current spikes indicative of an overload condition.

II. Summary

Provided in this disclosure is a control system and related method in which a current sensor monitors current in an electrical motor to determine a current level. A control method includes monitoring a measured current level drawn from an electrical motor supplying power to mechanical components under varying operating conditions. A step is performed of determining whether the measured current level exceeds a maximum acceptable current level. If the measured current level does not exceed the maximum acceptable current level, the system continues to monitor the measured current level. If the measured current level exceeds the maximum acceptable current level, the system deactivates current to the electrical motor and then initiates an increment counter circuit. The system then continuously evaluates the increment counter circuit to determine whether a predetermined number of increment counter cycles is reached (where the predetermined number of increment counter cycles is preferably three.) If the predetermined number of increment counter cycles is not reached, a predetermined time delay is added, and the electrical motor is activated. If the predetermined number of increment counter cycles is reached, a fault condition is indicated where the measured current level remains above the maximum acceptable current level, followed by deactivating the electrical motor.

In one aspect, the maximum acceptable current level is a default current level indicative of normal motor operation. In another aspect, the maximum acceptable current level is a current level in a range of 5-90% in excess of normal motor operation. In the preferred embodiment, the maximum acceptable current level is 20% in excess of normal motor operation. The fault condition indicates an overload condition resulting from a faulty motor or potential jamming of mechanical components powered by the electrical motor. If the current level remains above the maximum acceptable current level, the motor is deactivated. If the current level is below the maximum acceptable current level, a determination is made that the elevated current level is due to a short duration transient current spike. The predetermined time delay is a momentary interval between deactivating and reactivating the electrical motor. Preferably, the momentary interval is 0.2 seconds.

The present control system includes a current sensor component configured to measure a measured current level drawn from an electrical motor while supplying power to mechanical components. A memory component retains a maximum acceptable current level. A comparing component compares the measured current level to the maximum acceptable current level. A switch deactivates the electrical motor if the measured current level is above the maximum acceptable current level. An increment counter circuit verifies excess current draw over the maximum acceptable current level for a predetermined number of increment counter cycles. If the predetermined number of increment counter cycles is not reached, control instructions are implemented for adding a predetermined time delay and to the switch for activating the electrical motor. If the predetermined number of increment counter cycles is reached, control instructions are implemented for indicating a fault condition where the measured current level remains above the maximum acceptable current level and to the switch for deactivating the electrical motor.

According to an aspect, the present invention addresses problems associated with overload in an electrical motor.

According to another aspect, the present invention specifically addresses overload in an electrical motor due to the jamming of mechanical components powered by the electrical motor.

According to still another aspect, the present invention helps avoid an overcurrent condition which can result in burnout in the electrical motor.

According to a further aspect, the present invention helps distinguish between false overload indications dues transient current spikes indicative of a spark in the motor and an actual overload condition.

Other benefits and advantages of this invention will become apparent to those skilled in the art to which it pertains upon reading and understanding of the following detailed specification.

III. BRIEF DESCRIPTION OF THE DRAWINGS

The disclosed control system may take physical form in certain parts and arrangement of parts, embodiments of which will be described in detail in this specification and illustrated in the accompanying drawings which form a part hereof and wherein:

FIG. 1 is a schematic view depicting a control system and related method of operation in accordance with the present invention.

IV. DETAILED DESCRIPTION

Reference is now made to the drawings wherein the showings are for purposes of illustrating embodiment(s) of the control system and related method and not for purposes of limiting the same, wherein like reference numerals are understood to refer to like components.

The flow chart of FIG. 1 depicts an operational mode of the present control system 10, where it is to be appreciated that the indicated blocks in the flow chart correspond to discrete structural components of a control system 10 and also a control methodology implemented by the control system 10. A current sensor component is indicated as a "Read Sensor" block 12 in the flow chart. The current sensor is configured to measure the current level drawn from an electrical motor 14 while supplying power to mechanical components such as a spreader system under varying operating conditions. At the "Read Sensor" block 12, the current sensor reads the measured current level from the electrical motor 14 and cooperates with the control system 10 to trigger a switch 16 to deactivate the electrical motor 14 if the measured current level is found to be unacceptably high. The control system 10 can also selectively trigger the switch 16 to reactivate the electrical motor 14. The "Read Sensor" block 12 can be configured so that the current sensor can measure the current level continuously or at specific intervals.

With continued reference to FIG. 1, the control methodology continues from the "Read Sensor" block 12 to a "Hi Current Detected?" decision block 20 corresponding to a memory component and a comparing component of the control system 10. The memory component retains a maximum acceptable current level value while the comparing component compares the measured current level to the maximum acceptable current level value. A NO result at the "Hi Current Detected?" decision block 20 loops back to the "Read Sensor" block 12, where the process continues to monitor the current level of the electrical motor 14.

With ongoing reference to FIG. 1, a YES result at the "Hi Current Detected?" decision block 20 indicates detection of a current level above the maximum acceptable current level. At the "Shut Down Motor Driver" block 22, the control system 10 sends an instruction to the switch 16 to deactivate the current to the electrical motor 14. The control methodology continues to an "Increment Counter" block 24 where an increment counter circuit of the control system 10 is initiated to verify excess current draw over the maximum acceptable current level for one or more increment counter cycles. The control methodology continues to an "Is Counter=3?" decision block 30 in which the value of the increment counter circuit is continuously evaluated until three (3) increment counter cycles are reached. However, it is to be appreciated that three is simply a desired selected value and any suitable value can also be selected without departing from the invention.

With further reference to FIG. 1, the "Is Counter=3?" decision block 30 includes control logic employed by the control system 10 for reactivating the current to the electrical motor 14. Thus, a NO result from the "Is Counter=3?" decision block 30 indicates to the control system 10 that the measured current level is below the maximum desired current level. A predetermined time delay is added at the "Delay" block 32, after which the control methodology flows to "Turn on Motor Driver" command block 34 which activates the switch 16 and instructs the "Read Sensor" block 12 to continue monitoring the current.

With still further reference to FIG. 1, the methodology flows from a YES result at the "Is Counter=3?" decision block 30 to an "Indicate 'Motor Short'" block 36 which indicates that the measured current level remains above the maximum acceptable current level. The control system 10 determines that a fault condition exists associated with an overload in the electrical motor 14. The control system 10 thus receives an indication of "Motor Short" which can be displayed as an error message or other type of indicator, after which control flow continues to a "Stop" block 38 in which the control system 10 instructs the switch 16 to deactivate the electrical motor 14.

If a fault condition is found to exist, a message indicator can be provided for indicating to an operator when the fault condition of the motor 14 is detected. The message indicator can be a visual indicator such as a light on a user interface of the control system. The message indicator can include alphanumeric indicia to display a text-based alert message to the operator. Alternatively or in addition to a visual message indicator, another suitable type of indication such as an audible alert can be sounded using any suitable audible component.

In one aspect of the present invention, the maximum acceptable current level can be a predetermined threshold of current in a range of 5-90% in excess of the current level required for normal motor operation. The threshold value can be retained in the aforementioned memory component. Specifically, the predetermined threshold is preferably 20% in excess of normal motor operation.

As also shown in FIG. 1, the switch 16 deactivates the current to the electrical motor 14 upon detecting the current level above the predetermined threshold. The switch 16 is subsequently used for reactivating the current to the electrical motor 14. In the preferred embodiment, the switch 16 is configured to interrupt the current for a momentary interval between deactivating and reactivating the electrical motor 14, thereby resetting the motor 14. Preferably, the momentary interval is 0.2 seconds, though any suitable interval could be implemented without departing from the invention.

If the current level is determined to be below the predetermined threshold, the control system 10 determines that a transient spark occurred in the motor 14, and that no fault condition exists and that the problem was resolved by using the switch 16 to deactivate and reactivate the motor 14. However, if the current level is determined to remain above the predetermined threshold after deactivating and reactivating the motor 14 with the switch 16, the control system 10 determines that a fault condition exists associated with an overload in the electrical motor 14, thereby indicating a fault condition to an operator. However, the control system 10 could also be adapted for use in detecting an overcurrent condition in an electrical motor 14 that does not directly supply power to mechanical components, all without departing from the invention.

In the above described manner, the present invention is a control system and related method for monitoring current in an electrical motor, preferably for a mechanical system such as a spreader, to accurately detect a mechanical overload condition, though the present invention can be readily adapted to any other type of motor. The present control system overcomes the problem of distinguishing between a short duration high current transient spike caused by sparking of brushes in the DC motor, and a long duration continuous high current caused by a mechanical overload condition in the DC motor by momentarily deactivating and reactivating the motor. If high current is no longer detected, the control system construes this result as a transient spike and no fault condition is indicated. If high current persists, the control system construes this outcome as an actual overload condition, and a fault condition is indicated to the operator. In this manner, a "double check" is performed in the system before alerting the operator of an overload condition. In the preferred embodiment, the present control system performs the double check in software and not via wired circuitry. Thus, a selected default threshold current level can be established in the control system which can be selectively reestablished if conditions within the device change over time.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A control method, comprising:
   monitoring a measured current level drawn from an electrical motor supplying power to mechanical components under varying operating conditions;
   determining whether the measured current level exceeds a maximum acceptable current level;
   wherein if the measured current level does not exceed the maximum acceptable current level, continuing monitoring the measured current level;
   wherein if the measured current level exceeds the maximum acceptable current level,
      deactivating current to the electrical motor,
      initiating an increment counter circuit,
      continuously evaluating the increment counter circuit to determine whether a predetermined number of increment counter cycles is reached,
      wherein if the predetermined number of increment counter cycles is not reached,
         adding a predetermined time delay,
         activating the electrical motor,
      wherein if the predetermined number of increment counter cycles is reached,
         indicating a fault condition where the measured current level remains above the maximum acceptable current level,
         deactivating the electrical motor; and
   wherein the fault condition indicates an overload condition resulting from at least one of a fault in the electrical motor or potential jamming of mechanical components powered by the electrical motor.

2. The method of claim 1, wherein the maximum acceptable current level is a default current level indicative of normal motor operation.

3. The method of claim 1, wherein the maximum acceptable current level is a current level in a range of 5-90% in excess of normal motor operation.

4. The method of claim 3, wherein the maximum acceptable current level is 20% in excess of normal motor operation.

5. The method of claim 1, wherein if the current level remains above the maximum acceptable current level, deactivating the motor.

6. The method of claim 1, wherein if the current level is below the maximum acceptable current level, determining that the elevated current level is due to a short duration transient current spike.

7. The method of claim 1, the predetermined time delay is a momentary interval between deactivating and reactivating the electrical motor.

8. The method of claim 7, wherein the momentary interval is 0.2 seconds.

9. The method of claim 1, wherein the predetermined number of increment counter cycles is three.

10. A control system, comprising:
    a current sensor component configured to measure a measured current level drawn from an electrical motor while supplying power to mechanical components;
    a memory component for retaining a maximum acceptable current level;
    a comparing component for comparing the measured current level to the maximum acceptable current level;
    a switch for deactivating the electrical motor if the measured current level is above the maximum acceptable current level;
    an increment counter circuit to verify excess current draw over the maximum acceptable current level for a predetermined number of increment counter cycles,
       wherein if the predetermined number of increment counter cycles is not reached,
          control instructions for adding a predetermined time delay,
          control instructions to the switch for activating the electrical motor,
       wherein if the predetermined number of increment counter cycles is reached,
          control instructions for indicating a fault condition where the measured current level remains above the maximum acceptable current level,
          control instructions to the switch for deactivating the electrical motor; and
    a visual indicator for indicating an overload condition resulting from jamming of mechanical components powered by the electrical motor.

11. The control system of claim 10, wherein the maximum acceptable current level is a default current level indicative of normal motor operation.

12. The control system of claim 10, wherein the maximum acceptable current level is a current level in a range of 5-90% in excess of normal motor operation.

13. The control system of claim 12, wherein the maximum acceptable current level is 20% in excess of normal motor operation.

14. The control system of claim 10, further comprising a visual indicator for indicating an overload condition resulting from jamming of mechanical components powered by the electrical motor.

15. The control system of claim 10, wherein the time delay is a momentary interval between deactivating and reactivating the electrical motor.

16. The control system of claim 15, wherein the momentary interval is 0.2 seconds.

* * * * *